United States Patent [19]
den Hollander et al.

[11] Patent Number: 4,651,328
[45] Date of Patent: Mar. 17, 1987

[54] ARRANGEMENT FOR SUPERVISING A CMI-CODE CONVERTER

[75] Inventors: Cornelis J. den Hollander; Geert Winters, both of Hilversum, Netherlands

[73] Assignee: U.S. Philips Corporation, New York, N.Y.

[21] Appl. No.: 794,864

[22] Filed: Nov. 4, 1985

[30] Foreign Application Priority Data

Nov. 6, 1984 [NL] Netherlands ............... 8403366

[51] Int. Cl.⁴ .................................. H04B 14/04
[52] U.S. Cl. .................................. 375/25; 375/19; 360/43
[58] Field of Search ............... 375/25, 48, 49, 45, 375/60, 62, 17, 19; 360/42, 43, 45, 40; 329/111

[56] References Cited

U.S. PATENT DOCUMENTS

| | | | |
|---|---|---|---|
| 3,783,383 | 1/1974 | Forster et al. | 375/19 |
| 3,828,346 | 8/1974 | Forster et al. | 375/19 |
| 3,953,673 | 4/1976 | Dornard | 375/19 |
| 4,071,692 | 1/1978 | Weir et al. | 375/17 |
| 4,189,621 | 2/1980 | Scott | 360/40 |

Primary Examiner—Robert L. Griffin
Assistant Examiner—Stephen Chin
Attorney, Agent, or Firm—William J. Streeter; Gregory P. Gadson

[57] ABSTRACT

Arrangement for supervising a CMI-code converter in a PCM-multiplex transmission system, in which a binary signal is converted into a CMI-signal or vice versa, the code converter having a first terminal for the CMI-signal and a second terminal for the binary signal, characterized in that the first input of the code converter is connected to a first input of a modulo-2 divider and also via a delay element to a second input of a modulo-2 divider, that the output of the modulo-2 divider is connected to a first input of a summing device, that the second terminal of the decoder unit is connected to a second input of the summing device and that the supervising signal is produced at the output of the summing device.

2 Claims, 4 Drawing Figures

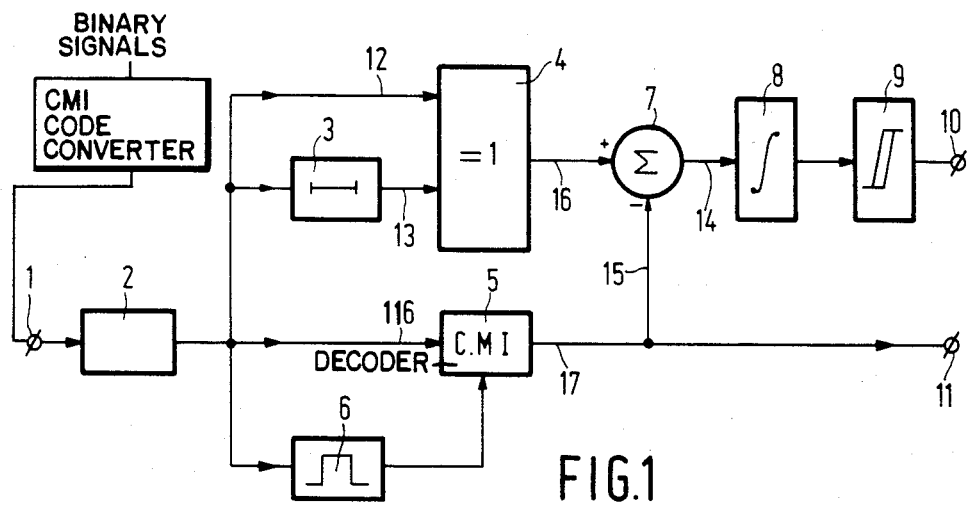
FIG.1
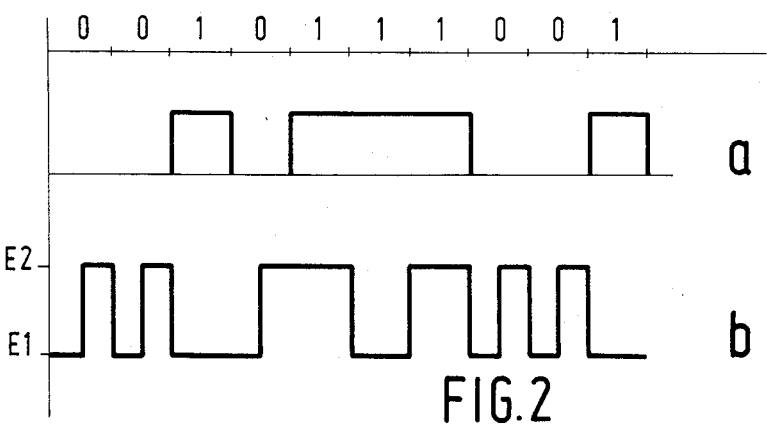
FIG.2
| I | | II | | III | IV |
|---|---|---|---|---|---|
| nT | (n+1)T | nT | (n+1)T | (n+1)T | (n+1)T |
| 0 | 0 | 0 1 | 0 1 | 0 0 | 0 0 |
| 0 | 1 | 0,1 | 1 1<br>0 0 | 1 0<br>0 1 | 0 -1<br>-1 0 |
| 1 | 0 | 1 1<br>0 0 | 0 1 | 1 0<br>0 1 | 1 0<br>0 1 |
| 1 | 1 | 0 0<br>1 1 | 1 1<br>0 0 | 1 1 | 0 0 |
FIG.3

ARRANGEMENT FOR SUPERVISING A CMI-CODE CONVERTER

FIELD OF THE INVENTION

The invention relates to an arrangement for supervising a CMI-code converter in a PCM-multiplex transmission system, in which a binary signal is converted into a CMI-signal or vice versa, the code converter having a first terminal for the CMI-signal and a second terminal for the binary signal.

BACKGROUND OF THE INVENTION

In a digital multiplex transmission system such as described, for example, in Netherlands Patent Application No. 8203110 a digital signal is applied at the transmitting side to a CMI-encoding unit in which the digital signal is converted into the CMI-code format (coded mark inversion) recommended for the bit rate. The CMI-code is a two-level code in which a logic 0 bit is encoded such that each of the two levels is present during half a bit time interval, first one level and thereafter the other level. A logic 1 bit is encoded by one of the two levels during an entire bit period interval and in such a manner that the level alternates for sequential logic 1 bits. At the receiver end of the CMI-interface the digital path comprises a CMI-decoder unit in which after equalization and recovering with the aid of the recovered system clock the received CMI-encoded signal is converted into the normal binary code. The original, composite digital signal is then available at the output of the CMI-decoding unit with the nominal bit rate and the original system clock.

In said transmission systems it is customary to supervise the code converters to prevent a cascade of alarms from occurring downstreams when the code converter does not function correctly. This type of supervision frequently utilizes the redundance of the line code of the input signal. The line code rule is then supervised for any infringements, such that when the number of infringements exceeds a predetermined threshold the conclusion can be made, when the input signal is a correct signal, that the decoding unit is defective.

If a supervision circuit of said type is to have any practical sense, then the restriction holds that the complexity of the supervision circuit must be low compared with the circuit it supervises. This excludes, for example, a bit-by-bit comparison. Also operating with twice the clock frequency of the input signal for transmitting the two levels in one bit period of a CMI-encoded signal at the clock frequency, and to supervise the line encoding rule in that way, is impractical in view of the high clock frequency (140 MHz) of the CMI-input signal.

SUMMARY OF THE INVENTION

The invention has for its object to provide a supervising circuit for a CMI-code converter which is of a simple construction and satisfies the requirements imposed. The invention is characterized in that the first input of the code converter is connected to a first input of a modulo-2 divider and also via a delay element to a second input of the modulo-2 divider, that the output of the modulo-2 divider is connected to a first input of a summing device, that the second terminal of the decoding unit is connected to a second input of the summing device and that the supervision signal occurs at the output of the summing device.

The invention will now be described by way of example with reference to the accompanying drawings.

BRIEF DESCRIPTION OF THE DRAWINGS

FIG. 1 shows a block circuit diagram of the supervising arrangement according to the invention;

FIG. 2 shows time sequence diagrams for converting a binary signal into a signal of the CMI-code format;

FIG. 3 shows a CMI-encoding Table;

DETAILED DESCRIPTION OF THE INVENTION

Figure 4:
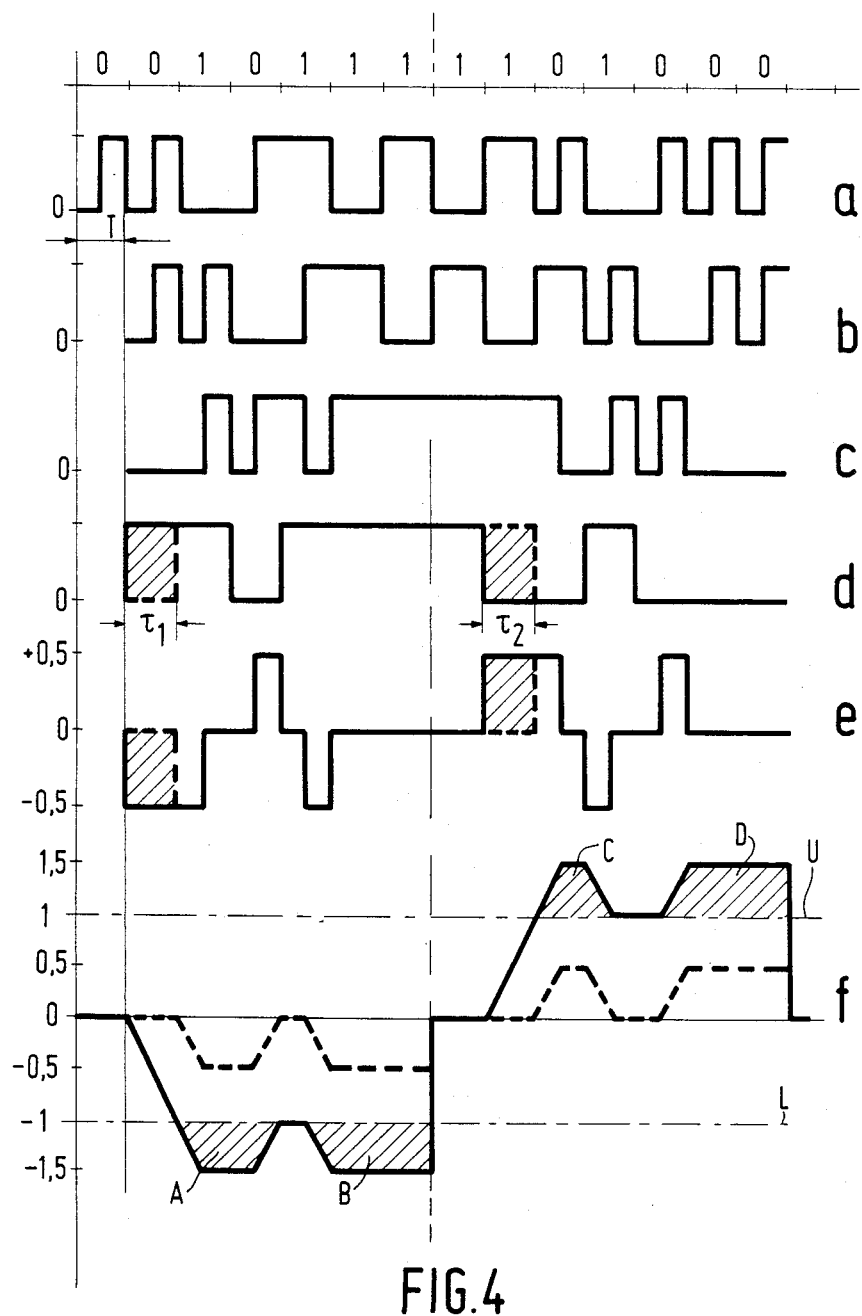
FIG. 4 shows a time sequence diagram for explaining the operation of the arrangement of FIG. 1.

In the arrangement shown in FIG. 1, reference numeral 5 denotes a CMI-decoder unit to whose first input 116 the CMI-encoded input signal, originating from the equalizer 2, is applied. The CMI-signal to be equalized is applied to the input 1 of the equalizer 2. The output of the equalizer 2 is connected to a first input 12 of a modulo-2 divider 4. The output of the equalizer 2 is further connected via a delay element 3 to a second input 13 of the divider 4 which may, for example, be in the form of a double-balanced modulator. The output of the equalizer 2 is also connected to an input of the clock regenerator 6, whose output signal controls the CMI-decoder unit 5. The output of the divider 4 is connected to a first input 16 of a summing device 7, whose second input 15 is connected to the second terminal 17, i.e. the output of the decoder unit 5. The output 14 of the summing device 7 is connected via an integrator 8 to the input of a level detector 9 which has two threshold levels. An alarm signal is supplied from the output 10 of the level detector 9 when the signal applied to its input exceeds one of these two levels.

In FIG. 2, the time sequence diagrams give an example of the conversion of a binary signal with logic 1 bits and logic 0 bits (diagram a) into a CMI-encoded signal (diagram b). The CMI-code is a 2-level code in which a logic 0 bit is encoded such that each of the two levels $E_1$ and $E_2$ is present during half a bit period interval, first $E_1$ and then $E_2$. A logic 1 bit is encoded by one of the two levels $E_1$ or $E_2$ during an entire bit period interval, and that such that the level changes for consecutive logic 1 bits. A CMI-signal of a shape as shown in FIG. 2b is applied to the first input 12 of the divider 4. The same signal but delayed through an entire bit period interval is applied to the second input 13 of the divider 4. The modulo-2 sum of the two CMI-input signals of the divider 4 is applied to the first input 16 of the summing device 7. The decoded CMI-signal which has a shape as shown in FIG. 2a is applied to the second input 15 of the summing device 7.

The invention is based on the recognition that when the running digital sum of the difference between said binary signal and said modulo-2 sum is determined at the output 14 of the summing device 7, this running digital sum will always be between 0 and 1 for a correctly operating decoder unit 5. This fact is used as the supervision criterium, which will be described in greater detail with reference to FIG. 3. In the column I all the possible combinations of the binary signal present at the second input 15 of the summing device 7 are shown in two adjacent entire bit period intervals $n \cdot T$ and $(n+1)T$, n and $(n+1)$ being the numbers of the time intervals considered and T being the duration of an entire bit period interval. Column II (nT) shows the CMI-signal which corresponds to the binary signal shown in column I (nT). Column II (n+1)·T shows the CMI-signal which corresponds to the binary signal shown in column I (n+1)T. The signal from column II ((n+1)·T) is applied to the first input 12 of the divider 4 whilst the signal from column II (n·T) is applied to the second input 13 of the divider 4, this being the signal supplied T seconds earlier to the first input 12 of the divider 4. Column III shows in each square the two modulo-2 sums in the two half-bit period intervals of the CMI-signals of the columns II (n+T) and II ((n+1)·T). Column IV shows the running digital sum in the two half-bit intervals of the CMI-signal from column II minus the binary signal from column I (n+1)·T. This last-mentioned signal is present at the output 14 of the summing device 7. Column IV shows that when the coding unit 5 functions correctly, this running digital sum will always be between −1 and +1. If the running digital sum at the output 14 of the summing device exceeds 1 or is less than −1, one can derive therefrom that the decoding unit 5 does not function correctly and an alarm signal can be transmitted. This will be described in greater detail with reference to FIG. 4.

FIG. 4a shows any random CMI-signal such as it is applied to the first input 12 of the divider 4. This same CMI-signal is now applied, delayed by a whole bit interval T, to the second input 13 of the divider 4. The resultant signal at the output 16 of the divider 4 is shown in FIG. 4c and is equal to the modulo-2 sum of the CMI-signals such as they are shown in FIGS. 4a and 4b. FIG. 4d shows the decoded binary signal, such as it is present at the output 17 of the decoding unit 5. Let it now be assumed that in the bit intervals $T_1$ and $T_2$ an incorrect conversion is effected. In the bit interval $T_1$ the binary signal should have had the value 0 instead of 1, as shown. In the bit interval $T_2$ the binary signal should have had the value 1 instead of 0 as shown. The signal occurring at the output 14 of the summing device 7 is shown in FIG. 4e and is the difference between the signals shown in FIGS. 4c and 4d. This signal is integrated over a number of bit intervals, for example 7 intervals, with the aid of integrator 8. The integrated signal has a shape as shown in FIG. 4f by means of a solid line. It will consequently be apparent that as a result of an incorrect conversion in the bit interval $T_1$ the lower limit L in the hatched portions A and B is exceeded, and that because of the incorrect conversion in the bit interval $T_2$ the upper limit U in the hatched areas C and D will be exceeded. The limits U and L are the two voltage levels to which the level detector 9 is set. Now the level detector 9 will supply an alarm signal from its output 10 at the occurrence of the hatched areas A, B, C and D. FIG. 4f shows by means of a dotted line the variation of the integrated signal at the output of the integrator 8 when the decoding unit 5 operates correctly. Consequently, in that case the logic 0 in CMI-code format in the bit period $T_1$ is converted into a binary logic 0, see FIG. 4d, dotted line. In addition, the logic 1 in CMI-code format in the bit interval $T_2$ is converted into a binary logic 1, see FIG. 4d, dotted line in bit interval $T_2$. Consequently the signal integrated by the integrator 8 remains within the two limits U and L, so that the level detector 9 will not supply an alarm signal from its output 10.

FIG. 1 shows an embodiment of a method of supervising a CMI-decoding unit. It will be obvious that this manner of supervision is also possible for a CMI-encoding unit in which a binary input signal is converted into a CMI-output signal. In that case the signal flow is from 11 to 1 instead of from 1 to 11, as shown in FIG. 1 for a CMI-decoding unit.

What is claimed is:

1. An apparatus for supervising a Code Mark Inversion code converter in a Pulse Code Modulated multiplex transmission system, wherein a binary signal is converted into a code mark inversion signal or vice versa, the code converter having a first terminal for the code mark inversion signal and a second terminal for the binary signal, the apparatus comprising:

a modulo-2 divider having connected to a first input thereof the first terminal of the code converter;

a delay element having connected thereto the first terminal of the code converter, the delay element having an output connected to a second input of the modulo-2 divider;

a decoding means connected to the first terminal of the code converter, the decoding means having a terminal;

a summary means having connected to respective first and second inputs thereof an output of the modulo-2 divider and the terminal of the decoding means;

wherein a signal for supervising the code converter is output from the summary means.

2. An apparatus according to claim 1, further comprising:

an integrator for receiving the output signal from the summary means;

a level detector for receiving from the integrator an integrated output signal from the summary means, the level detector having two threshold levels, the level detector supplying an alarm signal when one of the levels is exceeded.

* * * * *